(12) United States Patent
Leung

(10) Patent No.: US 8,798,956 B2
(45) Date of Patent: Aug. 5, 2014

(54) METHOD AND APPARATUS FOR SURFACE SENSING INPUT DEVICE

(75) Inventor: Omar S. Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 979 days.

(21) Appl. No.: 12/242,343

(22) Filed: Sep. 30, 2008

(65) Prior Publication Data

US 2010/0082286 A1    Apr. 1, 2010

(51) Int. Cl.
*G01P 15/00* (2006.01)

(52) U.S. Cl.
USPC .......................................... 702/141

(58) Field of Classification Search
CPC .... G01P 15/001; G01P 15/003; G01P 15/005
USPC ................................................. 702/142, 141
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,583,541 A | 12/1996 | Solhjell | |
| 5,714,694 A | 2/1998 | Diessner | |
| 5,825,350 A * | 10/1998 | Case et al. | 345/163 |
| 5,835,077 A | 11/1998 | Dao et al. | |
| 5,854,625 A | 12/1998 | Frisch et al. | |
| 6,040,821 A | 3/2000 | Franz et al. | |
| 6,128,006 A * | 10/2000 | Rosenberg et al. | 345/163 |
| 6,292,174 B1 | 9/2001 | Mallett et al. | |
| 6,515,651 B1 | 2/2003 | Berstis | |
| 7,061,469 B2 | 6/2006 | Suprun et al. | |
| 7,489,298 B2 * | 2/2009 | Liberty et al. | 345/158 |
| 7,688,307 B1 * | 3/2010 | Tsyrganovich | 345/158 |
| 2003/0214486 A1 | 11/2003 | Roberts | |
| 2004/0008188 A1 | 1/2004 | Liu | |
| 2004/0080494 A1 | 4/2004 | Fahlman | |
| 2004/0217941 A1 | 11/2004 | Chen | |
| 2005/0024332 A1 | 2/2005 | Chen | |
| 2005/0104853 A1 | 5/2005 | Sitalasai et al. | |
| 2006/0164393 A1 | 7/2006 | Wu et al. | |
| 2007/0079155 A1 | 4/2007 | Liao et al. | |
| 2007/0107068 A1 | 5/2007 | Kelley et al. | |
| 2009/0012725 A1 | 1/2009 | Vaananen | |
| 2010/0039382 A1 * | 2/2010 | Kumagai et al. | 345/158 |
| 2010/0082270 A1 | 4/2010 | Baskett et al. | |

OTHER PUBLICATIONS

"U.S. Appl. No. 12/353,732, Response filed May 7, 2012 to Non Final Office Action mailed Dec. 6, 2011", 11 pgs.
"U.S. Appl. No. 12/353,732, Non Final Office Action mailed Dec. 6, 2011", 16 pgs.

* cited by examiner

*Primary Examiner* — Mohamed Charioui
(74) *Attorney, Agent, or Firm* — Brownstein Hyatt Farber Schreck, LLP

(57) ABSTRACT

An improved input device, such as a mouse, for a processing system, such as, a computer system; and a method for operating that input device. The system monitors at least one indicia of movement, such as an operating parameter of the input device, where the operating parameter has a first characteristic when the input device is in one operating position or state and a second characteristic when the input device is in another position or state. In one example, the operating parameter includes generally vertical movement of the input device.

15 Claims, 6 Drawing Sheets

METHOD AND APPARATUS FOR SURFACE SENSING INPUT DEVICE

BACKGROUND OF THE INVENTION

The present invention relates generally to methods and apparatus for controlling an input device to a processing system, such as a computer; and more specifically relates to improved methods and apparatus for controlling an input device's response to movement sensed either through one or more accelerometers or through a vibration sensor to refine control of the input device.

Input devices for computers and other processing systems, such as those typically referred to individually as a computer "mouse," are well-known to provide data used to incrementally move an indicator such as a cursor on a display to control the processing system. Many such "mice" operate through direct communication with an external surface. Examples of such mice include various devices that operate through physical contact of a caged ball with a support surface to provide an indication of movement through detection of the movement by orthogonally-arranged sensors detecting relative X-Y directional movement of the ball relative to the sensors. Similarly, mice are well-known which utilize an optical sensor to detect movement of the device relative to a support surface.

Input devices have recently been proposed, both by the present inventor and by others employed by the assignee of the present application, for input devices such as a computer mouse, that function in the absence of the described physical or optical interaction with a support surface. These recently-proposed input devices operate using other types of sensors, as will be described in more detail later herein, without the need for such mechanical contact or optical elements. These recently-proposed input devices may be in the form of conventional devices such as those normally thought of as "mice." However, these input devices may also be another configurations as may be desired in any particular context to provide directional and/or positional input.

Additionally, input devices are known that use one or more accelerometers, sometimes in combination with one or more gyroscopes, to provide an indicator of movement to control a cursor, where the input devices are intended for providing such movement indicators in response to movement in free space. Some examples of these devices are controllers as used for game consoles, and handheld controls for remote control of a computer.

One consideration in designing such input devices is how to facilitate the user-intended operations through the device even when the device is subjected to unintended or disruptive movement. One example of such unintended or disruptive movement is when the input device falls or is dropped. In such a circumstance, depending upon the configuration and operation of the device, the motion and/or impact may be sensed by the input device and processed as a motion input. It would be preferable for the input device not provide an output, such as might be used to move a cursor, when the sensed parameters may be interpreted to suggest that a motion experienced by the device is not under the apparent control of the user, or is otherwise apparently not intended for cursor control.

Accordingly, the present invention provides new methods and apparatus for operating such input devices which can provide recognition of input device motion unlikely to have been initiated or intended for cursor control, and to thereby provide improved functionality of the input device.

SUMMARY OF THE INVENTION

The present invention utilizes one or more sensor signals from an input device to identify operational conditions that may lead to less than optimal identification of positional information through the device. In some examples, multiple indicators from the input device are utilized to determine a change in an operational condition of the input device. In one example of an input device, two such indicators are obtained from a single sensor in the device.

In one example of an input device in which two indicia of an operating condition are obtained from a single sensor, the sensors in the device include a Z-axis accelerometer that provides a measure of vertical acceleration. The Z-axis accelerometer provides a vibration signal in response to movement of the sensor along the support surface. This vibration signal provides a first indicator of moving contact with the supporting surface. Additionally, that accelerometer signal is filtered, or otherwise processed, to identify a velocity of movement relative to the Z-axis to provide a second indicator of the operating condition of the input device (in this case, the placement of the input device relative to the support surface). These two indicia are then evaluated to determine the operational state of the input device, for example, if the input device has left the support surface. Many additional structural and operational variations that may be implemented in various examples of the inventive subject matter are provided in the description that follows.

DETAILED DESCRIPTION OF PREFERRED EMBODIMENTS

The following detailed description refers to the accompanying drawings that depict various details of examples selected to show how the present invention may be practiced. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

For the purposes of this specification, a "processor-based system" or "processing system" includes a system using one or more processors, microcontrollers and/or digital signal processors having the capability of running a "program." A "program" is a set of executable machine code instructions, and as used herein, includes user-level applications as well as system-directed applications or daemons. Processing systems include communication and electronic devices such as cell phones, music and multi-media players, and Personal Digital Assistants (PDA); as well as computers, or "computing devices" of all forms (desktops, laptops, servers, palmtops, workstations, etc.).

Figure 1:
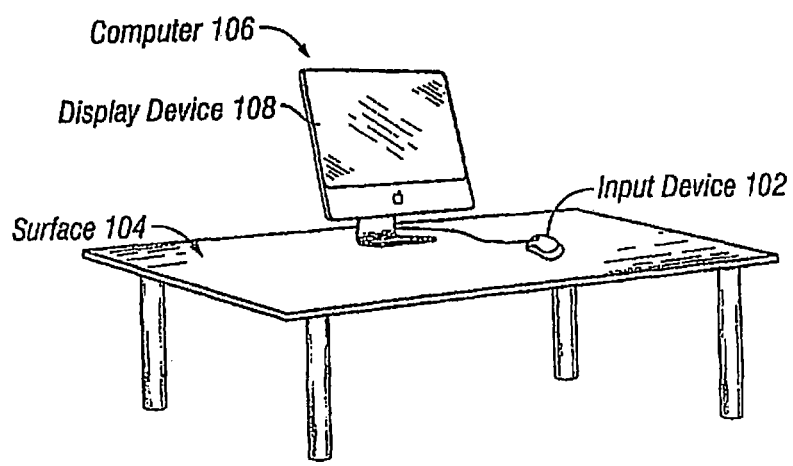
FIG. 1 depicts a representation of an input device in association with a computer in one common operating environment and configuration.

Referring now to FIG. 1, therein is depicted an input device 102 as one example of many possible configurations that may be used to implement the present invention. Input device 102 is connected to a computer 106 having a display device 108 associated therewith, in one example of an operative configuration. Input device 102 and computer 106 are both supported by a surface 104, depicted here as a table top. In this example, input device 102 is a computer mouse which will provide positioning information (including directional and speed of movement information) primarily in response to sliding movement of input device 102 relative to support surface 104.

Figure 2:
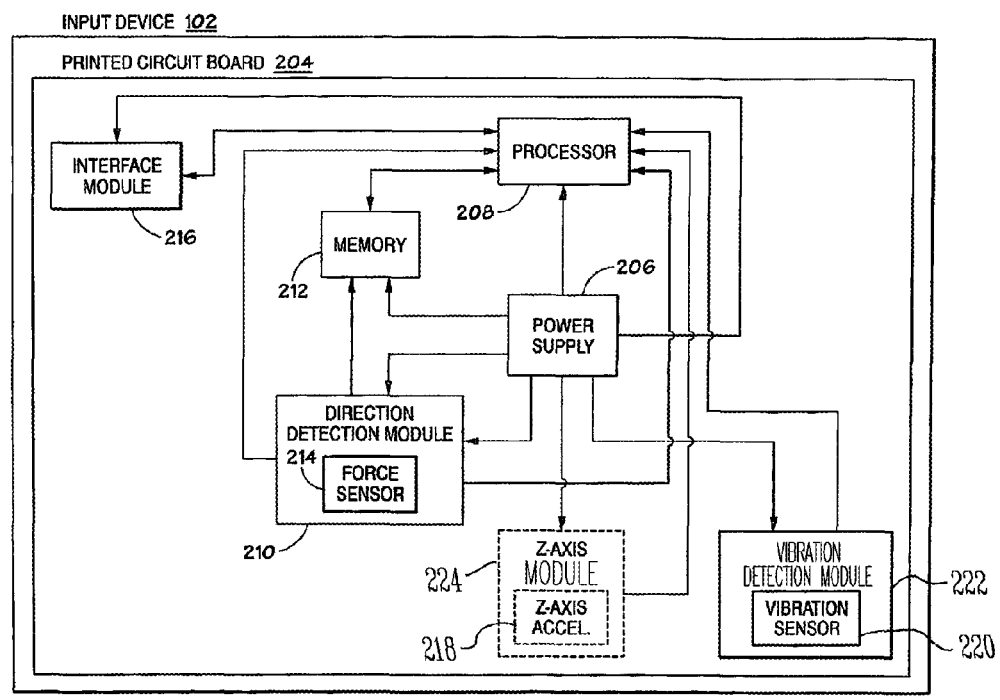
FIG. 2 depicts an input device, illustrated in block diagram form, that provides one example of a device in accordance with the present invention.

Referring now to FIG. 2, the figure depicts a block diagram representation of one example, out of many possible constructions, for input device 102. In the example of FIG. 2, all of the components are supported by or are at least electrically coupled to a printed circuit board (PCB) 204. In this example, input device 102 includes three separate sensors: a force sensor 214; a sensor sensitive to movement along a Z-axis (i.e., an axis extending generally vertically relative to a generally horizontal X-Y plane such as that defined by surface 104 in FIG. 1) such as a Z-axis accelerometer 218; and a vibration sensor 220. As will be apparent from the discussion to follow, each of the described sensors 214, 218, 220 provides a different form of data useful for operating input device 102. However, as will be apparent from the discussion, not all such data is essential to operating such an input device. Accordingly, as will be further discussed herein, all of these three sensors are not required for an input device implementing the present invention, and other examples of input devices may include, for example, only two of the above sensors; and some input devices implementing the present invention may include only vibration sensor 220. Input devices may also include additional sensors and/or sensor types in addition to the examples identified in this discussion.

In the depicted example, force sensor 214 will be used to provide data representative of the direction of movement of input device 102, and so is coupled to a direction detection module 210. Different configurations of force sensors may be contemplated for use in input device 102. In one preferred example, force sensor 214 will be an electromechanical device operable to sense mechanical loading resulting from friction between a contact surface of input device 102 and a support surface 104. In one such example, force sensor 214 includes a plurality of members cooperatively arranged to detect shear force in a plurality of directions, preferably at least two orthogonally-arranged directions. In one example of such a force sensor, the directional sensor will include at least two frames that are coupled to one another by one or more deformable members, such that the deformable members act as springs, and translational movement (arising in response to friction with a support surface communicated to one of the frames) will cause deflection of the relative positions of the two frames. A sensing mechanism functionally representative of the degree of deflection between the relative frame positions is included and is used to provide a signal representative of the deflection. One example of such a sensor is a variable capacitance sensor, where a pair of conductive plates, one carried by each frame, is used to establish a variable capacitance based on the separation distance between the plates, and to thereby provide an electrical signal representative of the deflection.

In one currently-preferred example of such a force sensor 214, as referenced above, the sensor includes three such frames cooperatively arranged such that deflection between a first pair of the frames along a first lateral axis (for example a X-axis) will generate a first force signal through a first capacitance sensor; and deflection between a second pair of frames along a second lateral axis, perpendicular to the first lateral axis (for example a Y-axis), will generate a second force signal through a second capacitance sensor. The signals from force sensor 214 will be processed by direction detection module 210 for communication to processor 208, which may then determine a direction vector from the two signals, in a manner similar to that employed with conventional mechanical contact mice. As will be apparent to those skilled in the art, the degree of processing that may be needed or desirable in direction detection module 210 may vary between different configurations for an input device. For example, the processing may be as simple as converting an analog signal to a digital signal for further digital processing, or may also include further steps including, e.g., filtering, amplifying (or otherwise biasing), etc., as are well-known in the art.

Alternative sensors for directional information are also possible. One example of another sensor for obtaining directional information uses two perpendicular accelerometer sensors oriented along orthogonal axes and arranged in the same or parallel planes. In some cases, this directional X-Y sensing may be performed by two axes of a three-axis accelerometer, as is well-known to those skilled in the art.

As noted above, input device 102 may include a vibration sensor 220. Vibration sensor 220 can be any of a variety of types that will be suitable for detecting vibration in some portion of input device 102 during movement of the device relative to a surface. For most input devices, the most straightforward measurement of such vibrations will be in the housing or shell of the input device, and in most such structures the vibrations will typically be relatively lower frequency vibrations, for example, vibrations between approximately 25 and 5000 Hz. In some examples, the input device may include structures specifically tuned for resonance to improve vibration monitoring.

As one example of a suitable vibration sensor 220, the sensor may be a piezoelectric component sensitive to physical vibrations in at least some portion of the input device. In other embodiments, the vibration sensor may be a microphone sensitive to vibrations in the air or other atmosphere with some portion of the input device. In yet other embodiments, the vibration sensor may be a vibrometer specifically configured to sense mechanically-conveyed vibrations in a selected structure in input device 102. Such a vibrometer may be a piezoelectric device or of some other construction. Vibrometers satisfactory for this purpose are known, but tend to be relatively expensive for use in an input device. Accordingly, one suitable alternative is a multi-axis accelerometer that exhibits a response resonance in a range making it suitable for use as a vibration sensor in an input device as described herein. For example, the ADXL203 three-axis accelerometer manufactured by Analog Devices of Norwood, Mass. is one suitable device. This accelerometer exhibits resonance frequencies, and thus peaks in the frequency response curve, at frequencies useful in an input device such as described herein. This multi-axis accelerometer typically exhibits resonant frequencies at approximately 1,000 and 5,000 Hz. The signal is sampled at a frequency greater than 2× the resonant frequency. The signal is then bandpass filtered to the desired frequency, and the amplitude (Root-Mean-Squared) of the signal is used as a measure of signal strength. This is used as speed when the device is in sliding mode.

As with force sensor 214, the output of vibration sensor 220 will be processed to whatever extent deemed appropriate, in vibration detection module 222. Again, the processing may be as simple as conversion of the analog output signal into a digital signal to enable further processing by processor 208, or may include further operations performed on the signal, as described above.

As depicted in FIG. 2, input device 102 may optionally include a Z-axis accelerometer 218, and a Z-axis module 224. Z-axis module 224 and accompanying accelerometer 218 are depicted in dashed lines to emphasize the optional nature of the inclusion of a separate module and sensor of this type. As noted above, Z-axis accelerometer 218 will be oriented to reflect vertical movement of input device 102. As one alternative, where vibration sensor 220 is implemented through use of a multi-axis accelerometer as described above, then that accelerometer may be utilized to provide a Z-axis acceleration signal without the need for either a separate sensor or processing module.

As can be seen from FIG. 2, in this example input device 102, each of the described modules, 210, 224, 222 is in electrical communication with power supply 206. Additionally, to the extent required, each sensor associated with each of the described modules will also be in electrical communication with power supply 206. Further, each sensor 214, 218, 220 will be in communication through its respective module 210, 224, 222 to provide one or more output signals to processor 208, as will be described in more detail later herein. As used herein, unless clearly indicated otherwise from context or by express language, a sensor output signal will remain the "output signal" from that sensor even though it may be modified or transformed, such as, e.g., through processing, filtering or transformation (such as from analog to digital domains). Thus, by way of example, communication of "an output signal" from force sensor 214 to processor 208 may occur, even though the output signal leaving force sensor 214 may be processed such as by being modified and/or transformed before reaching processor 208. As is apparent from the above discussion, each module may need to perform some processing of the signal from the associated sensor, and then additional processing to evaluate the signals will be performed, such as by processor 208. Many possible distribution of the processing responsibilities between one or more processors (either hardware or software-based). Thus, the input device may be understood to include a processing assembly that performs the various processing operations required, however they may be distributed between multiple devices.

Processor 208 may be of any suitable configuration known in the art for performing the necessary operations. Preferably, processor 208 will be either a relatively simple microprocessor or microcontroller performing operations defined by executable instructions retained in one or more installations of machine-readable storage media. In most examples of the invention, such machine-readable media will preferably be some form of memory or other compact storage within the input device. For example, the instructions may be retained in firmware or read only memory, which may either be internal to processor 208, or external, as depicted at 212. Memory 212 may include a combination of memory devices, potentially of different types, ranging from various configurations ranging from permanent memory to nonvolatile memory to volatile memory; all as are well known to those skilled in the art. Additionally, any executable instruction can be contained within a single machine-readable storage media, or may be distributed between multiple such mediums. Of course, processor may also be implemented entirely in hardware, such a through an application specific integrated circuit (ASIC).

Additionally, although the preferred construction for an input device is as depicted in FIG. 2, with a processor 208 in input device 102, and at least some of the instructions to be implemented by the processor retained on media within the input device, it should be recognized that the above structure is not required. Some or virtually all of the processing may be performed by a processor within the attached processing system. Similarly, all the instructions for the processor(s) (whether internal or external to the device) need not necessarily be retained on machine-readable media within the input device.

Input device 102 also includes an interface module 216 to facilitate communication between input device 102 and an external processing system, such as a computer (as depicted at 106 in FIG. 1). As is well-known in the art, interface module 216 may be configured to provide a wired electrical connection with the external processing system, such as through a USB bus, or any other communication interface as is known or apparent to those skilled in the art. Alternatively, interface module 216 may facilitate wireless communication with the external processing system such as through a Bluetooth link, or any other wireless interface as known or apparent to those skilled in the art.

Figure 3:
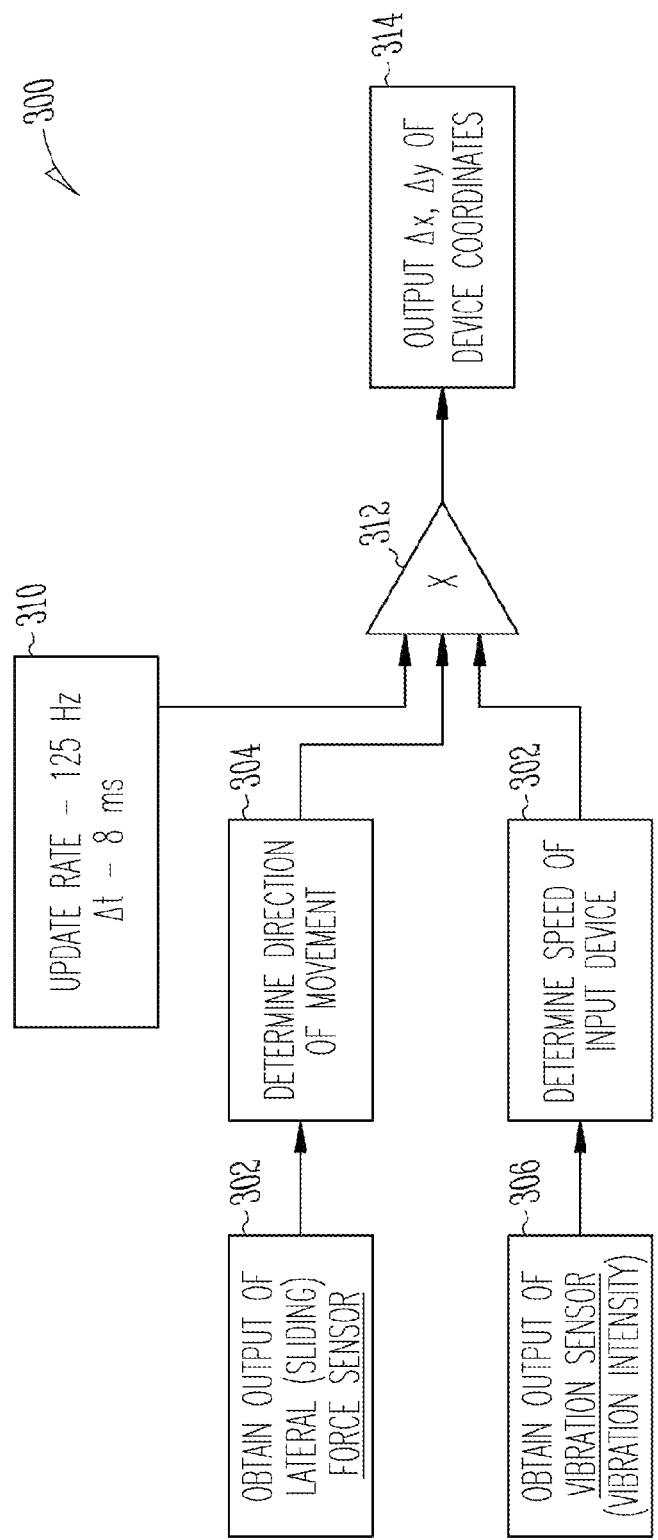
FIG. 3 depicts a flow chart depicting the fundamental operation of an input device such as that depicted in FIG. 2 to provide data representative of X-Y coordinates from the input device.

Referring now to FIG. 3, therein is depicted a flowchart 300 identifying the fundamental operation of an input device such as input device 102. For purposes of illustrating the operation of the input device through FIGS. 3-5, except as otherwise noted for demonstrating alternative examples, the input device will be one including a lateral force sensor assembly (as discussed in reference to direction detection module 210 and force sensor 214 in FIG. 2), and a vibration sensor 220 and vibration detection module 222, where the vibration sensor 220 is implemented through an accelerometer providing at least a Z-axis acceleration signal.

As can be seen in flowchart 300, one input will be the previously-described lateral force sensor output signals, as indicated at 302. As noted previously, force sensor outputs 302 will preferably include at least two directional signals representing orthogonally-arranged vectors indicative of lateral movement of an input device 102 relative to a support surface. As discussed earlier herein, the X and Y motions indicated by the force sensor may be combined in a conventional manner to yield a directional vector representing the direction of lateral, or planar, movement 304 of input device 102 relative to the support surface.

Additionally, the output of the vibration sensor 220 will represent a second input 306, and may be used at 308 to determine the speed. When this speed is combined with the direction from the force sensor it will be referred to as velocity. and duration of movement of input device 102. A number of techniques may be utilized to determine the speed of the input device through reference to the vibration signal from vibration sensor 220. For example, the number of signal spikes within a predetermined time interval may be used; or, alternatively, the number of the zero crossings of the signal spike may be used. Alternatively, a portion of the vibration response spectrum, representing the response during a certain time interval, may be modeled and subjected to a Fourier transformation to provide an estimate of the speed. Additional explanation of various methods for determining speed of an input device from vibration measurements may be found in U.S. patent application Ser. No. 12/235,326, filed Sep. 22, 2008, and entitled "Using Vibration to Determine the Motion of an Input Device;" and U.S. patent application Ser. No. 12/182,799, filed Jul. 30, 2008, and entitled "Velocity Stabilization for Accelerometer Based Input Devices;" each of which is assigned to the assignee of the present application; and each of which is incorporated herein by reference for all purposes.

As indicated in flowchart 300, in this preferred implementation, measurements are updated 310 approximately every 8 ms, or at a rate of approximately 125 Hz. As shown, the direction parameter 304 and speed parameter 308 will be combined 312 in a selected manner. One way to combine the inputs is to multiply the x and the y components of the force sensor by the magnitude of the speed measurement. to provide an output indicating incremental input device coordinates ($\Delta X$, $\Delta Y$) 314, which may then be processed in a conventional manner to provide updated coordinates for a cursor relative to pixels on a display screen. In one example implementation, the incremental input device coordinates will be conveyed to the attached processing system which will then implement suitable drivers to translate the incremental input device coordinates ($\Delta X$, $\Delta Y$) 314 into appropriate incremental movement between pixels of the display device.

Figure 4:
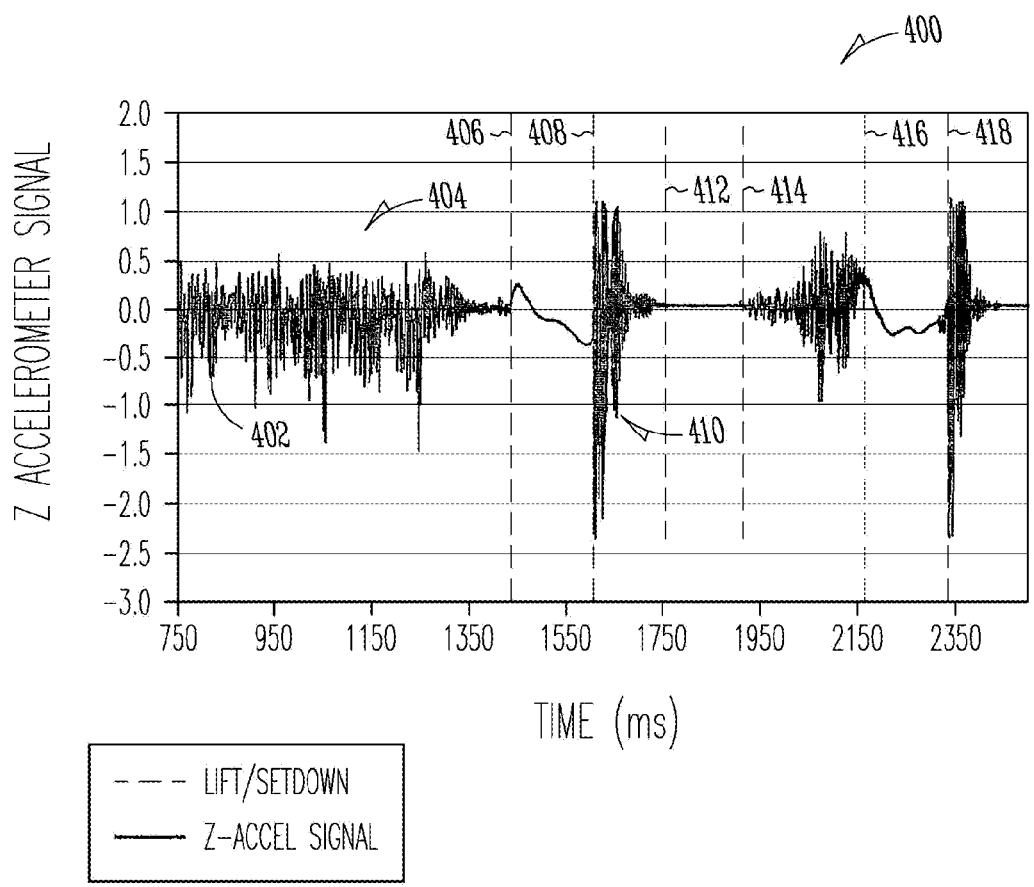
FIG. 4 depicts one example of an acceleration signal as may be generated during an example operating period of the input device of FIG. 2.
Figure 5:
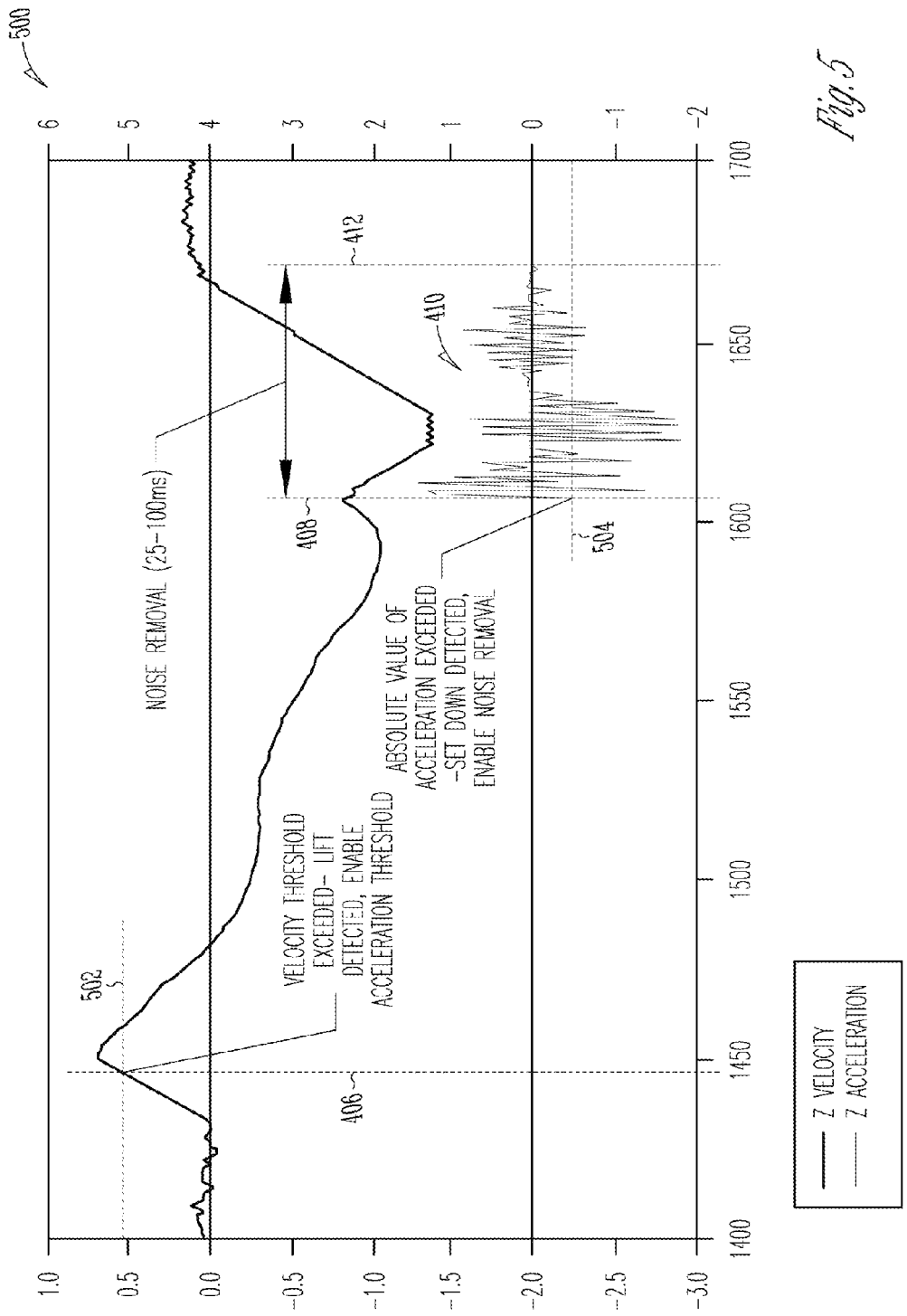
FIG. 5 depicts a portion of the signal depicted in FIG. 4, depicted in greater detail, and also depicted after filtering.

Referring now both to FIGS. 4 and 5, FIG. 4 depicts a graph 400 showing at least one portion of an accelerometer signal 402 of the example input device. As noted above, in this example the input device includes a vibration sensor comprising at least a Z-axis accelerometer, and FIG. 4 depicts a representation of an acceleration signal 402 as might be obtained from that Z-axis accelerometer over a time period evidencing various states of the input device. FIG. 5 depicts a portion of the acceleration signal 402 of FIG. 4 over a selected time interval, after having been filtered to yield a velocity signal, and also depicts a portion of the previously identified acceleration signal.

As depicted in a first region 404 of graph 400, starting from the beginning of the time scale of the graph, there is an oscillating Z-axis acceleration signal that may be used to determine the speed of movement of an input device relative to a support surface. That oscillating signal is indicative that: (1) the input device is moving, and (2) the input device is in a sliding mode-the intended operating mode for the example input device. However, at time 406, the oscillatory pattern ceases, and there is a smooth rising, and then falling, of the Z-axis acceleration signal 402, until substantial noise is seen at time 408. This corresponds to a "lift" and "set down" of the mouse in a span of 200 ms. Similar "lift" and "set down" events can also be seen between times 416 and 418. The absence of the oscillating response signal starting at time 406, evidences a lack of surface movement-induced vibration, and thus provides a first indicator that the input device may have left the support surface. However, this characteristic alone could also be indicative merely that a user has stopped movement of the input device, such as can be seen between times 412 and 414. Accordingly, reference is made to a second indicator characteristic. In addition to the indicator resulting from a change in vibratory pattern, as can be best seen in FIG. 5, there is also a velocity curve that may be obtained, such as through filtering of the accelerometer signal 402, as indicated at 500 in FIG. 5. The velocity curve proximate time 406 may be compared to a reference threshold 502, to provide a second indicator that the input device has left the surface. Reference threshold 502 may be empirically determined for any specific configuration of an input device as a velocity that is typically representative of a "lift" event of the input device. Although each of the identified indicators is certainly useful individually, neither one alone is a robust determinative of the "lift" state. If the z-axis motion is known, the lift can be detected, however it is preferable to have both types of measurements. In practice, the accelerometers tend to drift over time unless a second sensor is used to periodically center or reset the value to the proper value for a quiescent state. However, the combination of the two indicators provides high reliability of the "lift" determination.

Notwithstanding the desirability of using the described indicators in combination, in some example input devices, either of these indicators might be used in combination with a separate measurement to indicate a "lift" condition. As one example, a Z-axis velocity signal as described, in combination with an absence of a force sensor signal, indicating an absence of movement along a supporting surface, could be relied upon as an alternative indicator of a "lift" condition.

The identification of a "lift" event or condition facilitates enhanced control through the input device. For example, for an input device intended to provide signals only in reference to movement along a surface (as opposed to movement in free space), the departure from the support surface indicates that any signals that might indicate motion are not consistent with the intended operational mode, and thus should not be presented as valid changes for the input device coordinates ($\Delta X$, $\Delta Y$). This state exists for the duration of the "lift" interval, as depicted between time 406 and time 408. Additionally, there is an additional event that will typically occur when an input device again engages a surface. That "set down" event again has the potential to produce sensor data that could be erroneously identified as representative of positioning information.

As noted earlier herein, some input devices are configured with sensors capable of providing directional vectors when the input device is moved in free space, such as multiple accelerometers, possibly in combination with one or more gyroscopes. With such devices, desired operation will typically include providing incremental position changes for the input device coordinates while the device is moved within free space. Thus, for such devices, the identification of the "lift" event and condition is not required for preventing the output of incremental position coordinates during time in the lift state. However, the techniques of the present invention are still applicable to such devices because, as addressed below, even with such systems (as well as with surface movement-based input devices), a "set down" event has the potential to present data that could be erroneously identified as representative of positioning information.

When a "lift" event is identified, then one operating state change that will preferably be made, at least for surface movement-responsive input devices, is to stop communication of positioning data to the computer or other processing system. For any type of device in a "lift" condition, however, a further desirable operating state change is to prepare the device or processing system for a "set down" event. As will be apparent, the support surface may be the intended support surface, such as a table, where the "set down" event is an intended event such as replacing the input device on the table; or may be a different support surface, such as where an input device might fall onto a floor, representing an unintended event.

The specific results of a "set down" event may vary depending on the specific sensor configuration in the device. As depicted in FIGS. 4 and 5, reflecting the "set down" response of the described device, beginning at time 408, there is a period of relatively high amplitude and high frequency oscillations, as indicated generally at 410. By comparison to the sliding mode movement signals (as indicated, for example, at 404), it can be seen that such oscillations are substantially different from the signals indicative of a velocity of the identified input device, i.e., those signals that should be relied upon for the described device to update the input device coordinates. Because such oscillations on "set down" are a common manifestation, it is preferable to provide a "quiet period" when such an event is identified, so as to avoid unintended movement of a cursor.

Accordingly, once a "lift" event has been identified, such as between times 406 and 408 in graph 400, the system will preferably be configured to recognize a possible "set down" event, and to reject spurious vibratory signals resulting from the "set down" event, when determined. In some examples of the invention, the vibration signal may be subjected to bandpass and/or amplitude filtering, where a signal that extends outside of a pre-defined filter parameter is deemed to represent a "set down" event, which may then be used to establish a "quiet period," during which incremental input device coordinates will not be updated. For example, when the input device is in an "await event" mode, the acceleration signal may be high-pass-filtered to recognize the anticipated "set down" event. Another alternative is for the signal to be differentiated to remove smooth motion. With either method, the absolute value of the identified motion may be compared to a threshold 504, to identify when the "set down" event occurs. Upon such identification, it will typically be adequate to institute a predetermined "time out" or "quiet period," during which no positioning data will be output. As one example, such a "quiet period" may be implemented as a time out imposed through the signal refresh control, (as indicated at 310 in FIG. 3). For many configurations of input devices, a quiet period of approximately 16 to 32 ms. will typically be sufficient to avoid noise signals that could result in unintended positioning information. This quiet period can also be made proportional to the magnitude of signal upon set down.

Figure 6:
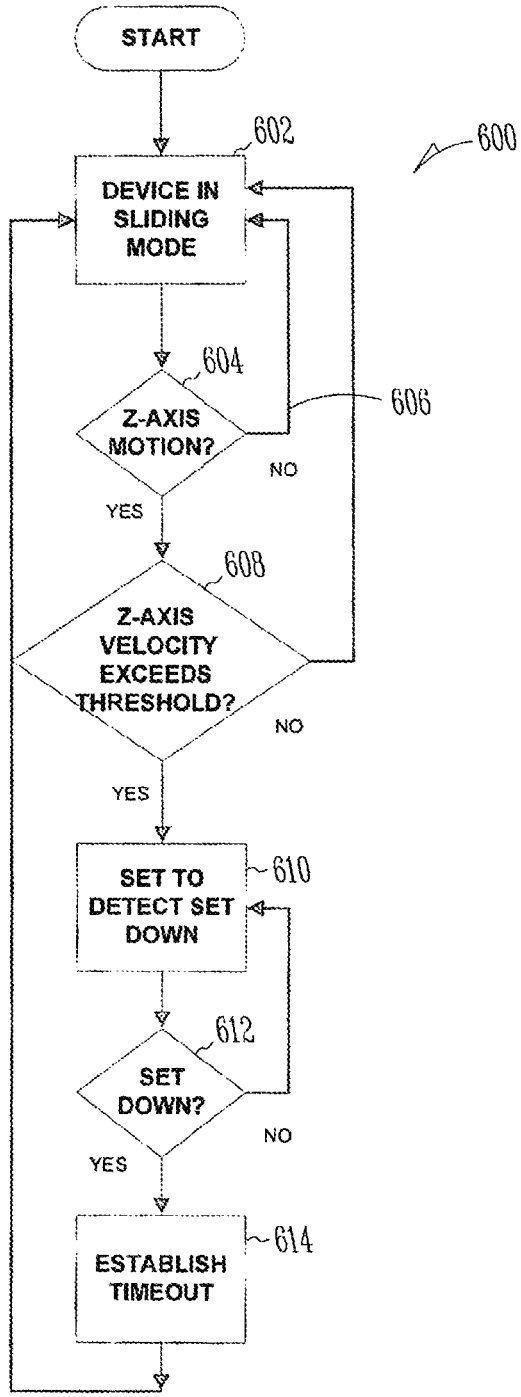
FIG. 6 depicts a flow chart of one example of operations that may be performed by an input device such as that of FIG. 2.

Referring now to FIG. 6, that figure depicts a flowchart 600 providing an example of an example algorithm that may be implemented to perform the methods described herein. Flowchart 600 is one identifying the operations used with an input device for which inputs are only anticipated when the device is moved (i.e. slid) along a surface. As will be apparent to those skilled in the art, the operations performed for a device intended to avoid undesirable positioning information for a device intended for operation in free space are a subset of the operations in flowchart 600.

In flowchart 600, the device will at some point be recognized to be in a sliding mode 602. In that mode, sensor signals will be processed in the intended manner to provide positioning information. As the sensor signals are processed, a determination will be made of whether there is Z-axis motion 604. This Z-axis motion my be identified, for example, either by an absence of oscillatory accelerometer signals, or by acceleration along the Z-axis. Where no such motion is detected 606, the device will be recognized to remain in sliding mode. Where Z-axis motion is detected, then a determination will be made as to whether the Z-axis velocity exceeds a threshold 608, as described in reference to threshold 502 in FIG. 5. Where the system determines that the velocity threshold (502) is exceeded, then the system will recognize the event as a "lift" event, and set a flag or establish a signal or other indicator of the "lift" event. At that time, once the "lift" status is recognized, the system may prepare for an anticipated "set down" event 610, as described earlier herein. In some example devices where the sensor configuration is such that it could provide spurious positioning information, an additional step may be inserted at this stage, which would be to institute a timeout or other operation for preventing the output of input device positioning information until after a "set down" event is identified.

With the system having been set to anticipate a "set down" event, the system will monitor one or more sensor signals to determine 612 when such a "set down" event occurs. Upon recognition of a "set down" event, the system will establish a "quiet period" 614 during which no device positioning information will be provided. The "quiet period" will preferably extend for a pre-selected duration, to avoid erroneous information that could otherwise result from processing of signals resulting from the "set down" event. As an alternative to, or in addition to, the establishing of a "quiet period" of a pre-selected duration, the system may compare one or more sensor parameters to a reference for that parameter to determine if the "quiet period" period should be extended.

Many additional modifications and variations may be made in the techniques and structures described and illustrated herein without departing from the spirit and scope of the present invention. For example, FIG. 2 discusses an input device having an on-board processor used for processing data from the modules associated with the individual sensors. Many variations may be made in the allocation of processing responsibilities. For example, as identified earlier, it is possible to avoid any substantial processing of data within the input device. In such an embodiment, the sensor signals may be processed to the minimal extent required for further communication and/or digitizing, then digitized and communicated across the interface for further processing by one or more processors within the computer or other processing system to which the input device is coupled. Additionally, the described techniques may be used with additional sensor signals, or measurements derived from such signals to refine detection of events creating data extraneous to the movement and other positioning information. Accordingly, the present invention should be clearly understood to be limited only by the scope of the claims and the equivalents thereof.

I claim:

1. A method for identifying an off-surface movement of an input device for a processing system, comprising the acts of:
   using a lateral force sensor to detect first movement of the input device along a supporting surface;
   using a vibration sensor to detect second movement of said input device relative to the supporting surface;
   using an accelerometer to detect third movement of said input device toward or away from the supporting surface; and
   identifying off-surface movement of the input device at least partially in response to a determination that the first, second, and third movements indicate that the input device is not in contact with the supporting surface.

2. The method of claim 1, wherein the act of identifying includes determining the absence of said first movement.

3. The method of claim 1, further comprising the acts of:
   calculating a velocity of said third movement; and
   comparing said calculated velocity to a threshold velocity.

4. An input device for a processing system, comprising:
a sensor associated with said input device and configured to provide a first output reflective of a vibration resulting from movement of the input device along a supporting surface;
a lateral force sensor associated with said input device and configured to determine direction of said movement;
an accelerometer associated with said input device to determine acceleration of said input device toward or away from said supporting surface;
a processing assembly configured to determine an input device z-axis velocity based at least in part on said accelerometer determination; and
said processing assembly further configured to determine whether said input device is not in contact with the supporting surface based at least in part on said first output in combination with said direction of movement and the determined input device z-axis velocity.

5. The input device of claim 4, wherein said processing assembly comprises:
one or more processors; and
one or more machine-readable media comprising instructions that, when executed by said at least one or more processors, perform operations comprising,
evaluating said input device z-axis velocity to determine whether said input device is not in contact with the supporting surface; and
providing an output when the input device is determined to not be in contact with the supporting surface.

6. The input device of claim 5, wherein the machine-readable media further comprises instructions that when executed by said one or more processors, perform operations comprising changing an operating parameter of the input device at least partially in response to said output.

7. The input device of claim 6, wherein the operation of changing an operating parameter of the input device at least partially in response to said output comprises causing the input device to not indicate positioning information.

8. The input device of claim 6, wherein the operation of changing an operating parameter of the input device at least partially in response to said output comprises preparing the input device to identify a possible forthcoming contact with a support surface.

9. A method for operating an input device for a processing system, comprising the acts of:
using a lateral motion sensor associated with said input device, to provide a first signal indicative of direction of movement of the input device along a supporting surface;
using a vibration sensor to provide a second signal indicating movement of said input device relative to the supporting surface;
using an accelerometer to provide a third signal indicating movement toward or away from the supporting surface; and
changing an operational condition of the input device at least partially in response to a determination that said first, second, and third signals indicate that the input device is not in contact with the supporting surface.

10. The method of claim 9, wherein said accelerometer is disposed in the input device so as to be sensitive to acceleration along a vertical axis.

11. The method of claim 9, wherein the act of changing an operational condition comprises suspending the output of positioning information from the input device.

12. The method of claim 9, wherein the act of changing an operational condition comprises preparing the input device to contact a support surface.

13. A computer system, comprising:
one or more processors;
a display;
at least one machine-readable storage medium; and
an input device, comprising,
a lateral force sensor to provide a first output indicative of a first movement of the input device along a supporting surface;
a vibration sensor to provide a second output indicative of a second movement of said input device relative to the supporting surface;
a z-axis accelerometer configured to provide a third output reflective of a third movement of the input device along a supporting surface perpendicular to the z-axis; and
a processing assembly configured to determine an input device z-axis velocity based at least in part on said second and third outputs; and further configured to determine whether said input device is not in contact with the supporting surface based at least in part on said first output in combination with the determined input device z-axis velocity.

14. The computer system of claim 13, wherein said input device further comprises: one or more processors;
one or more machine-readable media; and
wherein operations of said processing assembly are implemented at least in part through machine-readable instructions executed on said one or more processors of said input device.

15. At least one non-transitory machine-readable storage medium comprising instructions that when implemented by one or more processors, perform operations comprising,
monitoring a first parameter from an input device indicative of a direction of movement of the input device along a supporting surface;
monitoring a second parameter from the input device indicative of movement of said input device respect to the supporting surface;
monitoring a third parameter from the input device indicative of the acceleration of the input device toward or away from the supporting surface;
determining that the input device is not in contact with the supporting surface if the first parameter and the second parameter and the third parameter indicate that the input device is not in contact with the supporting surface; and
changing an operating condition of the input device in response to the determination that the input device is not in contact with the supporting surface.

* * * * *